J. F. CASS.
Milk-Cans.
No. 145,334. Patented Dec. 9, 1873.
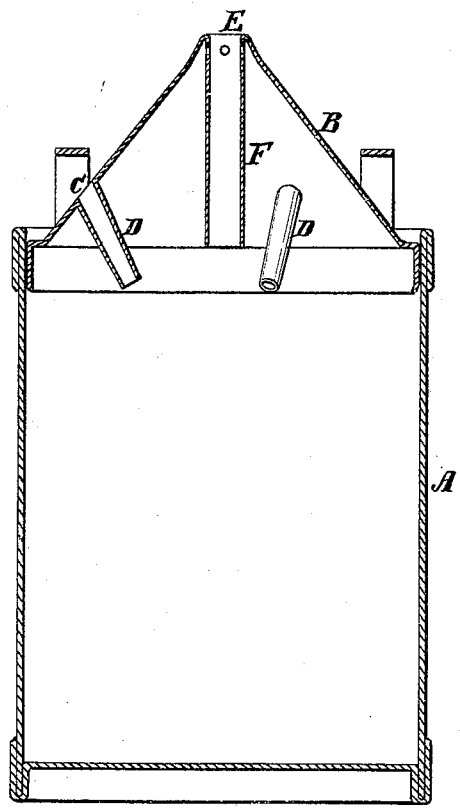
Fig. 1.
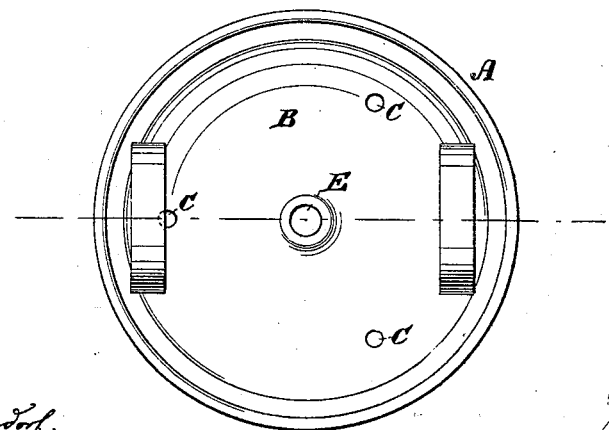
Witnesses:
A. Bennerndorf.
C. Sedgwick
Inventor:
J. F. Cass
Per Munn & Co.
Attorneys.

UNITED STATES PATENT OFFICE.

JAMES F. CASS, OF L'ORIGINAL, CANADA.

IMPROVEMENT IN MILK-CANS.

Specification forming part of Letters Patent No. 145,334, dated December 9, 1873; application filed July 19, 1873.

*To all whom it may concern:*

Be it known that I, JAMES F. CASS, of L'Original, in the Province of Ontario and Dominion of Canada, have invented a new and Improved Milk-Can, of which the following is a specification:

My invention consists of a conical cover for the can, with openings through it at or near the base, and tubes in connection with them; also, an opening at the top and a tube in connection with it, for ventilating the can and carrying off the animal heat and the odors of the milk by the action of the atmosphere, which impels fresh cool air in at the lower holes by the gusts blowing against the cover, and forces the warm air and odors within out through the tube at the top, so as to cool the milk efficiently as it is in waiting on the stand at the farmer's gate, or when being conveyed on the milk-wagon to the cheese or butter factory, or on cars to market, as the milk-can is intended principally as a carrying-can in connection with cheese and butter factories.

Figure 1 is a sectional elevation of my improved milk-can, taken on the line $x\ x$ of Fig. 2; and Fig. 2 is a top view.

Similar letters of reference indicate corresponding parts.

A is the can, which may be of any ordinary or approved kind. B is the conical cover. C are the openings around the base, through which the cool air is to enter. D are tubes in connection with said openings, to conduct the air down to the milk. E is the opening for the escape of the warm air and odors from the cans, and F a tube in connection with it, reaching downward toward the milk. This tube is mainly employed to prevent the milk from slopping out of the holes. The other tubes are also for this purpose, but they are also for conducting the incoming air down to the surface of the milk. Preferably some will be made longer than others, to conduct the air low down when the milk is low. The opening above will answer a good purpose, but it is better to have the tubes in connection. The tube E is perforated near the top for the escape of the warm air in the upper part of the cover.

Having thus described my invention, I claim as new and desire to secure by Letters Patent—

The combination of a conical milk-can cover, B, having air inlet and outlet passages C E, and pipes D and F, substantially as specified.

JAMES F. CASS.

Witnesses:
J. W. MARSTON,
JOHN BUTTERFIELD.